Nov. 1, 1966   G. F. QUITTNER   3,283,162
PHOTOSENSITIVE APPARATUS FOR DETECTING A FLAW IN MATERIAL
WITH STEADY ILLUMINATION MEANS
Filed Jan. 29, 1963   3 Sheets-Sheet 1

INVENTOR.
GEORGE F. QUITTNER
BY Richard MacCrutcher
ATTORNEY

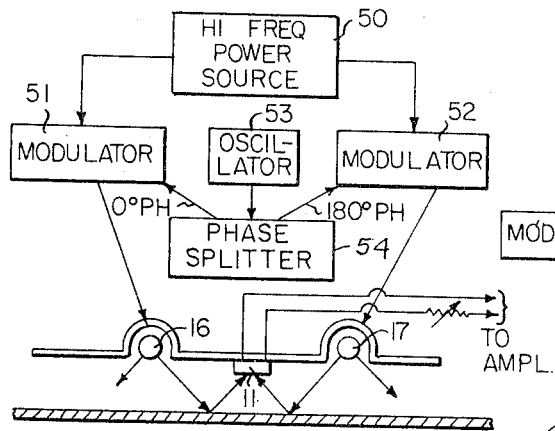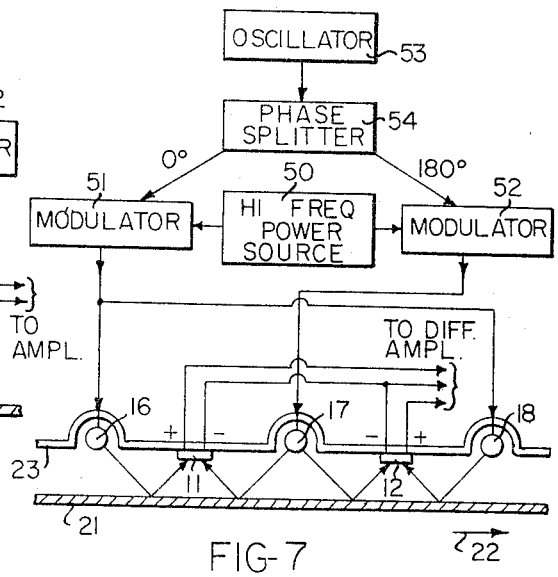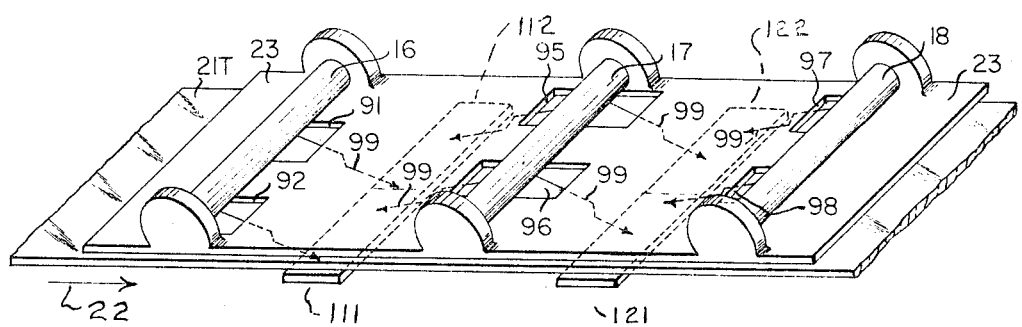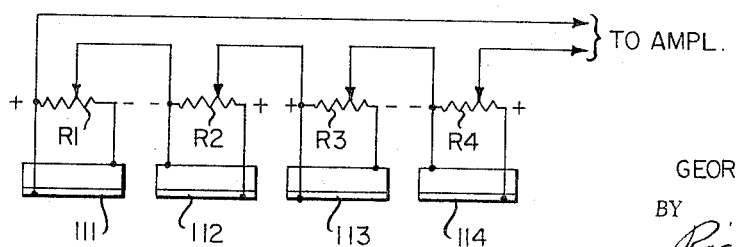

United States Patent Office 3,283,162
Patented Nov. 1, 1966

3,283,162
PHOTOSENSITIVE APPARATUS FOR DETECTING A FLAW IN MATERIAL WITH STEADY ILLUMINATION MEANS
George F. Quittner, Cleveland Heights, Ohio, assignor, by mesne assignments, to API Instruments Company, Chesterland, Ohio, a corporation of Ohio
Filed Jan. 29, 1963, Ser. No. 254,780
10 Claims. (Cl. 250—219)

The present invention relates to equipment for nondestructively testing material by the use of optical sensors.

There are a great many devices patented, and some in practical use, for automatically detecting flaws and flaw-like conditions on a surface of opaque, or within the body of transparent or translucent, lengths of materials. But, heretofore, automatic optical inspection of continuous sheets of material has been limited by the complexity, high maintenance and first costs, and instability of most equipments whenever high resolution has been sought, and by the inability to either obtain good resolution or to distinguish between flaws and irrelevant signals.

By the term "resolution" I mean the ability to resolve and clearly signal the presence of a small defect while the equipment inspects a relatively large area.

It is an object of the present invention to provide relatively simple and inexpensive means for attaining good resolution and good signal to noise characteristics previously unavailable or available only in much more complex and electronically redundant apparatus.

Other objects and advantages will become apparent and the present invention may be better understood from consideration of the following description taken in connection with the accompanying drawings, in which:

FIG. 6 is a diagrammatic view showing a carrier used to modulate two high frequency sources 180° out of phase;

FIG. 7 shows a preferred embodiment where two photocells and three lamps are used;

FIG. 8 shows a modification;

FIG. 9 shows a modification; and

Figure 1:
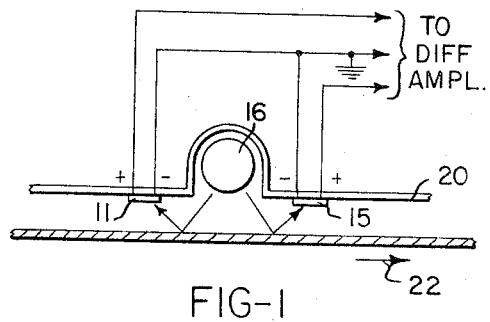
FIG. 1 is a schematic elevation showing a basic improvement applied for finding a fault in the finish of the uppermost side of an opaque sample material.
Figure 10:
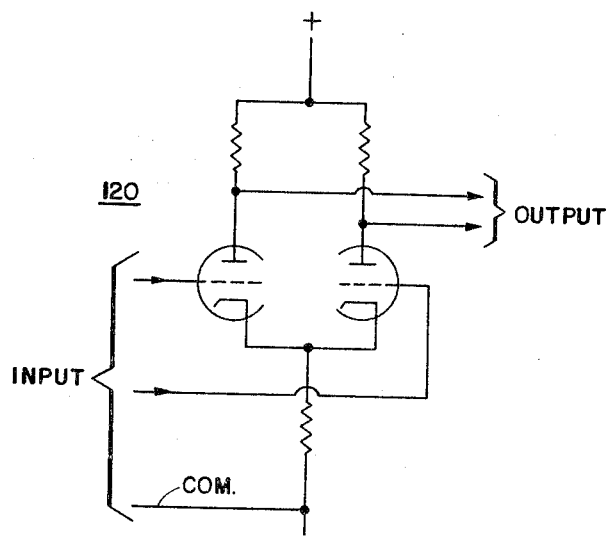

FIG. 10 shows a difference amplifier. Referring now to FIG. 1, an electric lamp 16 is assumed to be of circular cross section and extended length and it may be of gaseous discharge type. Located one on each side of the light source 16 are photocells 11, 15. It is assumed that 11, 16 and 15 are all supported by a mounting plate 20 while spaced apart one from the other along an axis of relative movement of a sample 21 moving in direction of arrow 22. A voltage source (not shown) is used to energize the lamp 16 and in the case of FIG. 1 an opaque sample 21, for example a sheet of stainless steel only the top surface of which is to be inspected for defects, has light from the source 16 reflected off itself and hence transmitted to the respective photocells 11 and 15.

Figure 2:
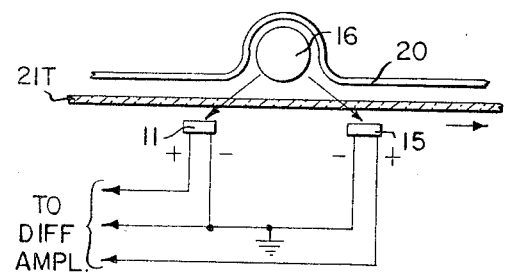
FIG. 2 is a view as in FIG. 1 except showing similar apparatus applied for finding a fault or flaw in a transparent sample material.

In FIG. 2 the arrangement is basically the same as in FIG. 1 except that a translucent or transparent sample 21T is assumed and hence the photocells are located on the opposite side of the sample with respect to the light source, but still 11, 16 and 15 are spaced apart along the axis of relative movement of 21T with respect to the rest of the assembly shown. FIGS. 1 and 2 represent alternatives either of which would be possible for each of the subsequently illustrated schemes.

In FIGS. 1 and 2 the cell lead polarities shown are one of two alternates; the ungrounded leads should be of like polarities, but which particular polarity they have is irrelevant. The polarity interconnection of output leads (e.g., from two photoelectric cells) is operable, according to various aspects of the present invention, if, when both cells are exposed to illumination maxima (necessarily essentially simultaneously where a single lamp is used as in FIGS. 1 and 2), the resultant signals fed to a subsequent difference amplified are accurately in phase. Although a difference amplified is not shown in the present case drawings such a device is known to the art and an example of particular circuitry which may be used is furnished by my copending U.S. patent application Serial No. 187,875, now abandoned, filed April 16, 1962, and assigned to the assignee of the present invention.

Although the arrangements as thus far described would work even if the lamp supply is D.C., or if it is ordinary 60 cycle A.C. much more advantageous arrangements are described hereinafter.

Although reading of average D.C. output from a photocell allows the equipment to discriminate against (and thus not signal) gradual changes in sample color, or in light source intensity, or in ambient light, it is well known that D.C. readout involving amplifying equipment is subject to drifts and other electronic problems. It is preferred, therefore, to couple signals via capacitors, which remove any D.C. component, and permit use of A.C. electronic amplifiers.

For reasons explained hereinafter at appropriate places, the following special terminology is used in the present specification and claims: by the term "power source" in reference to lamps, is meant a preferably relatively very high frequency constant R.M.S. value alternating current supply such as one operating at a frequency above 5 kc., although even a constant current D.C. source might be used. By the term "carrier frequency" is meant a relatively lower frequency, whose constancy of frequency is often important, used to amplitude modulate or otherwise characterize the lamp power source in a recurrent constant degree, and whose frequency might be selected to be in the range 50–2000 c.p.s. By the term "signal" is meant a relatively slow change in phase and/or amplitude of the photocell picked up carrier frequency, due to flaws or other phenomena sensed by photocells, whose outputs are (except for FIG. 6) combined and electronically treated (by a difference amplified as at least one component) to form a "suppressed carrier double sideband" signaling system, which need not (and preferably does not) recognize or pass "power source" frequencies or their harmonics.

The use of the carrier permits the use of filters or narrow frequency band A.C. amplifiers. This is advantageous not for economy but because vibrational signals and ambient (stray) light signals can then be removed to leave only flaw signals, since the noise signals occur almost entirely at frequencies other than that which the filters are tuned to pass.

The form of the lamp modulation is important. Use of D.C. excitation for ionized gas tubes (such as standard fluorescent lamps and "neon sign" type lamps) is unsatisfactory even if modulated, because of low frequency discharge disturbances which occur erratically in the tubes, and also because one end of a tube tends to darken, giving unequal light along its length. A gaseous discharge lamp excited by alternating has a brightness which varies at twice the power source frequency; because the lamp is not polarity sensitive and lights brightly for both positive and negative peaks, going out before voltage reaches zero twice each cycle.

Figure 3:
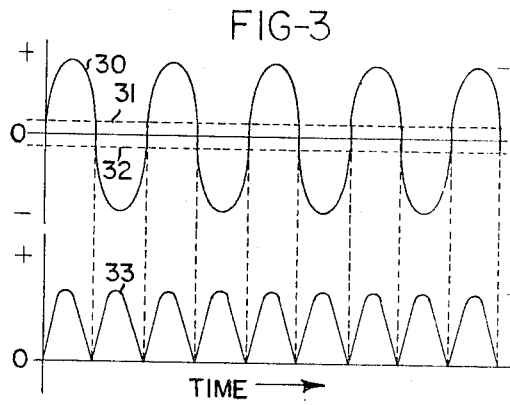
FIG. 3 is a graphic representation of curves respectively showing voltage and lamp brightness for one assumed condition of lamp operation.

Our preferred illumination scheme comprises an alternating current power source of a frequency much higher than that of the modulating carrier, for example 20 kc. or 100 kc. Of course this "power source" itself modulates the light at twice source frequency, but this is suppressed and thus discarded by the filter circuits as preferably designed. The high frequency power source is amplitude modulated at a selected "carrier" frequency, such as 1 kc., and, providing modulation is not carried too far, the lamp will not extinguish as modulation voltage passes through negative peaks. This may be more apparent from consideration of FIGS. 3 and 4. At the top of FIG. 3 relatively unmodulated power source voltage is plotted against time, and it may be considered that the time period during which the lamp would tend to be extinguished is so short that the lamp will not be extinguished while the voltage is too low, that is between the dasher lines 31 and 32, respectively above and below the zero ordinate, as is shown by the curve 33 at the bottom of FIG. 3 where unmodulated brightness is plotted against time.

Figure 4:
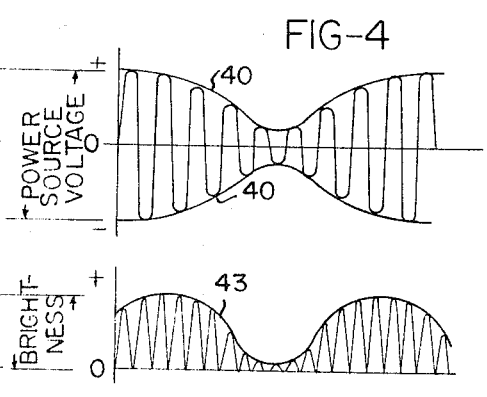
FIG. 4 is a graphic representation of curves of source voltage and lamp brightness for another, and preferred, condition of lamp operation.

In FIG. 4 the effect of modulation is shown. It forms an envelope 40 as a consequence of which the brightness envelope at modulating "carrier" frequency as indicated by the curve 43 never quite reaches zero.

Figure 5:
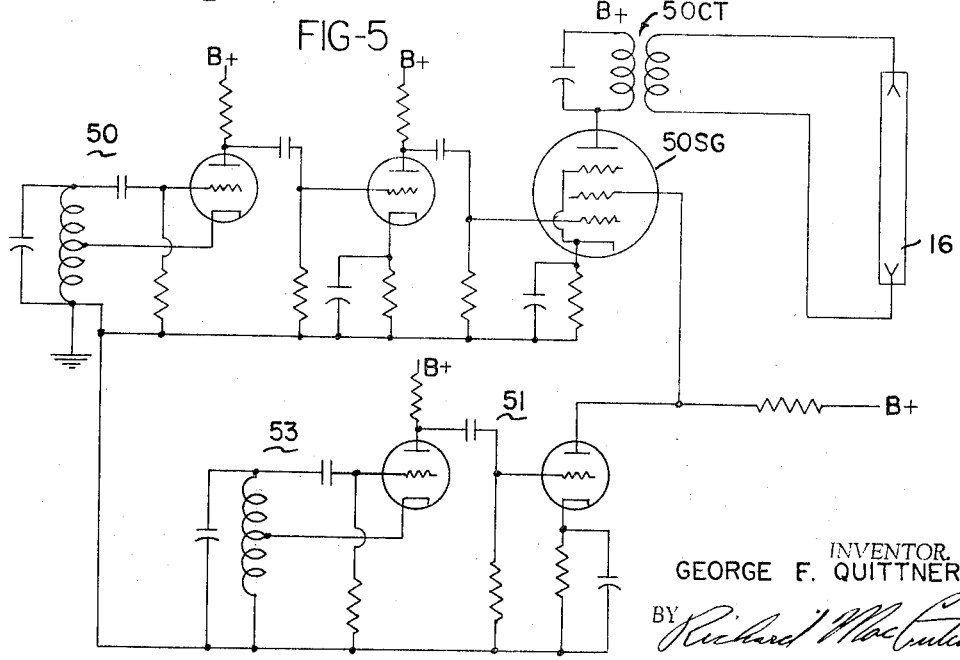
FIG. 5 is a circuit diagram showing more or less conventional electronic circuitry for producing a higher frequency output modulated by a lower frequency with the modulated output in this case serving as the supply for a lamp, for example of gas discharge type.

I prefer to call the modulating frequency, which is utilized in the interpretation equipment, the "carrier," and to call the higher frequency merely the "power source frequency" because it is changes in the amplitude of "the carrier" which are used for flaw signal information, it is the carrier frequency which is "suppressed" by nulling in a difference amplifier except when the presence of a flaw signals through only one cell. Completely traditional ways of modulating the power source are suitable, one example being shown in FIG. 5 having a power source high frequency oscillator 50, a power source output pentode 50SG, and a coupling transformer 50CT. A modulator is indicated generally at 51, and a carrier frequency oscillator indicated generally at 53 energizes the modulator which in turn has its output connected to the screen grid of power source output tube 50SG.

FIG. 1 (for a reflection system) and FIG. 2 (for a transmisssion system) together show one basic optical arrangement (i.e., comprising one light source and two photocells). A second basic arrangement is shown in FIG. 6 suggesting one photocell 11 with carrier frequency applied through a phase splitter 54 to modulate two light sources, 16, 17, 180° out of phase. As one source becomes brighter the other becomes darker. If the modulation as determined by phase splitter 54 is proper and linear there is a location for a cell between the two light sources where illumination is substantially constant, and at this "null location" (where photocell 11 is preferably located) little or no carrier frequency is present in the photocell output. The ability of the present invention's novel means of powering and modulating lamp light output, making quite good linearity easy to obtain, permits the relatively inexpensive attainment of very good nulls, for yielding desired high sensing sensitivity. Phase splitters are known in the art, and examples may be found in the "Industrial Electronics Handbook" (Cockrell, 1st edition, McGraw-Hill, 1958), FIGS. 4a–12, FIGS. 4a–13, FIGS. 4d–4a, FIGS. 4d–4c, FIGS. 4d–5a, et seq.

For practical convenience in some embodiments, instead of adjusting position of cell 11 to find the "null location," the cell may be approximately correctly located and the exact null there established by adjusting the intensity of one of the lamps for minimum cell output at carrier frequency.

An improvement of the FIG. 6 arrangement is shown in FIG. 7. Here the carrier oscillator 53 feeds a phase splitter 54 throwing the modulators, 51 and 52, 180° out of phase and consequently affecting halves of the dual output of the high frequency power source 50 with one circuit being used to feed lamps 16 and 18 and the other being used to feed an intermediate lamp 17 while the two photocells 11 and 15 are interposed between pairs of oppositely modulated lamps.

It may not be immediately apparent why FIG. 7 presents an arrangement so superior to FIG. 6. However it is only in theory that the null obtained in FIG. 6 is complete or perfect, and as a practical matter some carrier is left, but with the arrangement according to FIG. 7 a large part of the residue is canceled (nulled) in the difference amplifier. Since the better the null, the higher the system sensitivity to flaws (disregarding for the moment signal sources other than flaws and usually called "noise"), the FIG. 7 arrangement can lead to extremely high sensitivities suitable to finding very subtle flaws. This is true because the residuals (the carrier left after light source nulling) are very much alike at the two photocells, and thus can largely cancel each other in the difference amplifier.

The arrangements shown in FIGS. 1, 2, 6 and 7 indicate only an end view of the lamps and photocells, and for quite narrow samples the arrangement these figures assume are satisfactory. However they do not pick up widthwise differences in sample (as hereafter more fully explained) and another remaining problem is to discover defects which run along the length of the sample starting and stopping gradually but present with some seriousness in places between those ends. A usual approach to such a problem would be a side-to-side scanning system, as with a flying spot arrangement. Flying spot systems have many advantages, but also many disadvantages, the greatest being complexity (with attendant cost, maintenance and drift problems), and the difficulty of holding exact alignment so that sample edges are not signaled as flaws when near the edge portions are inspected.

I have invented or discovered an inexpensive way to accomplish this principal objective while avoiding such difficulties. This is shown in FIG. 8, which is a perspective simplified view of an embodiment having three lamps 16, 17, 18 mounted with respect to a support plate 23 holding them firmly with respect to a sample 21T moving in the direction of arrow 22. Brackets (not shown) cause support 23 to also firmly hold two "sets" of photocells on the opposite side of 21T which is assumed translucent (though the "sets" would be on the same side of sample as lamps if sample were opaque and to be only surface inspected). The photocell sets each have plural cells (111, 112, and 121, 122, respectively). The cells of any individual set may, for example, be connected as schematically shown in FIG. 9.

With relation to physical location of light source means, the cells are affected by the presence of slots provided in support 23. With the arrangement shown, there is a line of apertures beneath each lamp. Preferably the total distance from one end of each lamp to its other end is divided into equal length areas which are alternately open as shown (i.e., transparent) and opaque. Thus, starting at the edge of the sample material nearest the viewer in FIG. 8, first a slot 92 permits the nearest portion of the sample to be illuminated from the lamp 16. The same portion of the sample is not illuminated by either the middle lamp 17 or opposite end lamp 18 because there the associate support 23 is opaque.

Proceeding inward (away from observer) the next portion of sample is not illuminated by the lamp 16 but is illuminated through the slots 96 and 98 by the lamps 17 and 18. This system of alternate illumination is repeated until the sample adjacent the remotest usable ends of lamps is illuminated (in the case shown by lamps 17 and 18 through slots 95 and 97).

Individual slot width (in the direction of the lamp lengths) is the same for all slots, although slots 95, 96, 97 and 98 are staggered with respect to slots 91 and 92, though in actuality slots 97 and 98 might (like 91 and 92) be staggered with respect to slots 95 and 96 by just reversing the leads from one photocell set. Through all the slots light projects in the directions indicated by arrows 99.

The number of slots under each lamp could be any number and in FIG. 9 a photocell set is shown having four units (as might be used for an arrangement of four slots per lamp). A unit cell of the set, such as 111, is mounted in a line of such units with the length of the unit cell equal to the width of two (e.g., one transparent and one opaque) of the areas such as described in connection with FIG. 8, which showing could be extended to any width (to handle any width sample).

In the description for FIGS. 1, 2, 6 and 7, the use of a photocell of the type which can be as extensive as desired is implied. For such devices, and for this characteristic, silicon solar cells seem preferable. While the ideas can be carried out using other photocell types, silicon solar cells are usable under all conditions and are convenient and responsive to typical carrier frequencies such as one kc., and to the sort of light emitted by gaseous ionization discharge lamps such as inert gas plus mrecury vapor charged sign tubing.

Silicon solar cells are photovoltaic rather than photoresistive. Still, if an elongated cell is only partly illuminated, the unilluminated portions are a sensitivity reducing load on the current generated by more illuminated portions. Further, all portions of a cell, and different cells, are not likely to be equally sensitive. Thus a change in illumination of a small portion of a relatively large cell may give a small incremental current change in a sum current value. For wide sheet inspection, although the drawing FIGS. 1, 2, 6 and 7 assume a single, wide area cell, the arrangement shown leaves much to be desired in the way of incremental sensitivity.

FIG. 9 (besides being especially useful with apparatus as in FIG. 8) shows how these difficulties can be avoided and sensitive pickups constructed which will sensitively inspect wide sheets while preserving good resolution. In FIG. 9 relatively short individual photocells 111, 112, 113 and 114, which may be assumed physically located adjacent one another in line across the width of a sample sheet (not shown), are connected in series opposition. In the drawing, photocell 111 has a potentiometer R1 connected as a load resistor, and the desired voltage is sensed from the selected portion of R1's voltage drop. This potential has subtracted from it a selected portion of the total drop across R2, etc. Consequently the final sum voltage for all the cells in line (for example, lined up as a group transverse to the line of relative movement of sample in such manner as to take the place of a single one of the cells in FIG. 1) adds to zero for an even number of cells. This produces differential pickup sensitivity in the across-the-sheet direction, and permits inspection of wide sheets. Preferably (although not shown in FIG. 9), two such groups are spaced from one another along the path of relative movement to provide two signal channels which are fed through a difference amplifier as before.

A difference (i.e., differential) amplifier suitable for use with comparison arrangements such as those of FIGS. 1, 2, 7 and 8 may take any of many well known forms, one of which is shown generally at 120 in FIG. 10.

From consideration of the power connections of FIG. 7, and slots as in FIG. 8, it should be apparent that on one-half cycle of carrier the light illuminates cells through one group of transparent areas which may encompass a long flaw, and from the next half cycle from another group which does not. Consequently a defect in only one-half cycle's illumination areas is not balanced by the illumination during the same half cycle from the other open areas, thus produicng a flaw signal at carrier frequency. This technique is also advantageous in giving diagonal lighting, which will more often show rippletype flaws than would illumination in the direction of sample motion or illumination normal to direction of sample motion alone. It should be understood that the showing of slots is just a showing of a simple specific embodiment and the same lighting effects may be obtained if prisms or lenses are used.

There are thus provided arrangements of the class described capable of meeting the objects of this invention, providing novel means for powering lamps for inspection purposes, and novel means by which differential suppressed carrier signaling is obtained. The arrangements described and hereafter claimed compare very favorably with prior approaches to the problems solved inasmuch as such prior approaches proposed far more complex optical systems and many parallel channels of electronic equipment in order to provide desired degree of resolution.

While I have illustrated and described particular embodiments, various modifications may obviously be made without departing from the true spirit and scope of the invention which I intend to have defined only by the appended claims taken with all reasonable equivalents.

I claim:

1. In apparatus of the type used for detecting a flaw with relative movement of a sample material having relatively external length along the line of relative movement,
    first means which includes at least one light source arranged to illuminate the sample,
    second means which is a photocell means arranged with respect to the sample and the light source means in such manner as to be affected by the presence as contrasted with the absence of sample flaws, at least one of said first and second means being divided so as to comprise two like devices producing respective outputs operatively associated with instantaneously different portions of said sample material,
    third means for supplying said light source means with power at a first fixed frequency and fixed peak amplitude while modulating said power, at less than 100% of said amplitude, at a second fixed frequency which is lower than and less than two-fifths of said first frequency,
    and fourth means including separate connections respectively associated with said two like devices for nulling by offsetting the result of the output of each like device against that of the other in the absence of a flaw thus to cancel "noise" whereby to accentuate the readout of a flaw in the moving sample material.

2. Apparatus as in claim 1 further characterized by the first means comprising at least one light source, the second means comprising a pair of photocells, one located on one side of said light source along the line of relative movement of sample with respect to apparatus, and the other located on the other side of said source along the line of relative movement, and the fourth means including a three wire output from the photocell pair and also including a difference amplifier having as its input said three wire photocell output and providing as its output a two wire output.

3. Apparatus as in claim 1 further characterized by said first means comprising at least three light sources, there being two modulators for the power supplying means, said modulators being excited out of phase with one another and respectively affecting an outer pair and an intermediate, and intervening third one of said light sources so that as a consequence the sources are modulated out of phase and there exists null loci between them, at least a portion of the photocell means being located substantially in the location of at least some of said loci.

4. Apparatus according to claim 2 further characterized by said first means comprising at least two additional sources, and by said third means comprising means for modulating power supplied to two of said light sources in a predetermined first phase relationship and for modulating power supplied to a third of said light sources in a predetermined second phase relationship which differs from the first by 180°, said third mentioned light source intervening between the other two, while said second means comprises two photocells one located between said first and said third mentioned light sources and the other located between the second and the third.

5. Apparatus as in claim 3 further characterized by there being a means interposed between the light sources and the sample which means are effective to provide lighting upon the sample with a principal component of such lighting from one light source staggered with respect to the same from another light source along a line transverse to the line of relative movement of the sample with respect to apparatus.

6. Apparatus as in claim 5 further characterized by the last mentioned means comprising a support having staggered slots.

7. Apparatus as in claim 1 further characterized by the photocell means comprising two groups having equal numbers of photocells with the ones of each group spaced apart transverse to the line of relative movement, while the two groups are spaced from one another along the line of relative movement, the cells of each group being subtractively connected, each of the two groups providing a different one of two signal channels.

8. Apparatus as in claim 7 further characterized by means for making the output of each individual photocell manually djustable.

9. Illumination and optical sensing comparison apparatus for use with a relatively moving sample material, comprising:
a first source of high frequency A.C. power,
a second source of lower frequency A.C. power,
means for phase splitting power derived from said second source and for using phase split second source power to modulate power derived from said first source in two substantially differing phase relationships,
a light sensing means,
a first lamp connected to be energized from said sources in one of said two phase relationships,
a second lamp connected to be energized from said sources in the other of said two phase relationships,
a light sensing means, and
means for mounting said light sensing means and said lamps stationary with respect to the moving sample material and so that the first lamp provides illumination which by coupling with one instantaneously distinct portion of the sample material illumines the sensing means while the second lamp provides illumination which by coupling with another instantaneously distinct portion of the sample material illumines the sensing means, whereby to provide substantially steady illumination of sensing means except when the relation is disturbed by a flaw at either of said distinct sample portions.

10. Equipment as in claim 9 further characterized by a slotted plate means interposed to affect light paths from the lamps via said sample portions to the light sensing means.

References Cited by the Examiner
UNITED STATES PATENTS

| | | | |
|---|---|---|---|
| 2,315,287 | 3/1943 | Holloway | 250—223 X |
| 2,429,331 | 10/1947 | Sachtleben | 250—219 X |
| 2,548,755 | 4/1951 | Vossberg et al. | 250—233 X |
| 2,837,959 | 6/1958 | Saunderson et al. | 88—14 |
| 2,878,395 | 3/1959 | Mindheim | 250—219 |
| 2,892,951 | 6/1959 | Linderman | 250—219 |
| 2,939,016 | 5/1960 | Cannon | 250—219 |
| 3,081,403 | 3/1963 | Etzrodt et al. | 250—219 |
| 3,105,152 | 9/1963 | Nash | 250—219 |

RALPH G. NILSON, *Primary Examiner.*
WALTER STOLWEIN, *Assistant Examiner.*